US005950157A

United States Patent [19]
Heck et al.

[11] Patent Number: 5,950,157
[45] Date of Patent: Sep. 7, 1999

[54] METHOD FOR ESTABLISHING HANDSET-DEPENDENT NORMALIZING MODELS FOR SPEAKER RECOGNITION

[75] Inventors: Larry P. Heck, Sunnyvale; Mitchel Weintraub, Fremont, both of Calif.

[73] Assignee: SRI International, Menlo Park, Calif.

[21] Appl. No.: 08/844,542

[22] Filed: Apr. 18, 1997

Related U.S. Application Data

[60] Provisional application No. 60/038,542, Feb. 28, 1997, and provisional application No. 60/040,567, Mar. 14, 1997.

[51] Int. Cl.[6] .................................................... G10L 5/06
[52] U.S. Cl. ........................................ 704/234; 704/250
[58] Field of Search .................................. 704/231, 232, 704/234, 236, 243, 246, 244, 245, 250, 251, 256, 255

[56] References Cited

U.S. PATENT DOCUMENTS

| | | | |
|---|---|---|---|
| 4,653,102 | 3/1987 | Hansen | 381/92 |
| 5,187,692 | 2/1993 | Haneda et al. | 367/135 |
| 5,465,302 | 11/1995 | Lazzari et al. | 381/92 |
| 5,737,485 | 4/1998 | Flanagan et al. | 704/232 |

OTHER PUBLICATIONS

Reynolds, Douglas A., The Effects of Handset Variability on Speaker Recognition Performance: Experiments on the Switchboard Corpus, *Proc. of IEEE ICASSP*, pp. 113–116. May 1996.

Rosenberg, Aaron E., Speaker Background Models for Connected Digit Password Speaker Verification, *Proc. of IEEE ICASSP*, 1996, pp. 81–83.

*Primary Examiner*—Richemond Dorvil
*Attorney, Agent, or Firm*—Townsend and Townsend and Crew LLP; Kenneth R. Allen

[57] ABSTRACT

Adverse effects of type mismatch between acoustic input devices used during testing and during training in machine-based recognition of the source of acoustic phenomena are minimized. A normalizing model is matched to a source model, or dependent, upon an acoustic input device whose transfer characteristics color acoustic characteristics of a source as represented in the source model. An application of the present invention is to speaker recognition, i.e., recognition of the identity of a speaker by the speaker's voice.

31 Claims, 3 Drawing Sheets

METHOD FOR ESTABLISHING HANDSET-DEPENDENT NORMALIZING MODELS FOR SPEAKER RECOGNITION

STATEMENT OF RELATED APPLICATIONS

This patent application claims priority from U.S. Provisional Application No. 60/038,542, filed Feb. 28, 1997, and U.S. Provisional Application No. 60/040,567, filed Mar. 14, 1997. The content of these provisional applications is incorporated herein by reference for all purposes.

This invention was made in whole or in part with the use of Government funds. The Government may have certain rights in the invention.

BACKGROUND OF THE INVENTION

The present invention relates to methods and systems for machine-based recognition of the source of acoustic phenomena from the acoustic phenomena. More particularly, the present invention relates to methods and systems for machine-based recognition in which there may be a mismatch among acoustic input devices (e.g., telephone handsets) used during testing and during training. A particularly appropriate application of the present invention is speaker recognition, i.e., recognition of the identity of a speaker by the speaker's voice.

In speaker recognition, including telephone-based speaker recognition, it has been widely recognized that classification performance degrades due to corruptions of the signal in the transmission channel. Furthermore, it has been shown that one of the most significant contributors to performance degradation of speaker recognition systems is a mismatch in acoustic input device types between training and testing (e.g., training on carbon-microphone telephone handsets but testing on electret-microphone telephone handsets). See D. A. Reynolds, "The Effects of Handset Variability on Speaker Recognition Performance: Experiments on the Switchboard Corpus," *Proc. of IEEE Int. Conf. on Acoustics, Speech, and Signal Processing* ("ICASSP") (1996), hereinafter referred to as "Reynolds '96." In the present specification, the word "handset" will frequently be used for convenience of expression to mean any type of acoustic input device, including those that are not actually hand-held.

Speaker recognition systems have, in the past, made use of well-established techniques to compensate for channel distortions. Some of these techniques are described, for example, in the following references: B. Atal, "Effectiveness of Linear Prediction Characteristics of the Speech Wave for Automatic Speaker Identification and Verification," *J. Acoust. Soc. of Am.*, pp. 1304–1312 (1974) [hereinafter referred to as "Atal '74"]; F. Soong and A. Rosenberg, "On The Use Of Instantaneous And Transitional Spectral Information In Speaker Recognition," *IEEE Trans. on Acoustics, Speech, and Signal Processing* ("ASSP"), vol. ASSP-36, pp. 871–879 (June 1988) [hereinafter referred to as "Soong '88"]; and H. Hermansky et al., "RASTA-PLP Speech Analysis Technique," *Proc. of IEEE ICASSP* (1992) [hereinafter referred to as "Hermansky '92"].

Compensation techniques which have been used for speaker recognition include cepstral mean subtraction (Atal '74), using delta coefficients as acoustic features (Soong '88), and RASTA filtering of speech data (Hermansky '92). While systems using techniques such as the above can effectively compensate for linear channel distortions in the frequency domain, they are generally less effective in treating the handset mismatch problem. The reason for this lack of effectiveness is that handsets tend to have transfer characteristics which introduce distortions other than mere linear distortions in the frequency domain.

What is needed in the field of speaker recognition is a system that can maintain robust discrimination even in the presence of mismatch among the types of handsets used to process speech for recognition and for training speech models.

SUMMARY OF THE INVENTION

The present invention minimizes adverse effects of type mismatch between acoustic input devices used during testing and during training in machine-based recognition of the source of acoustic phenomena from the phenomena. According to the present invention, a normalizing model is matched to a source model based, or dependent, upon an acoustic input device whose transfer characteristics color acoustic characteristics of a source as represented in the source model. A particularly appropriate application of the present invention is speaker recognition, i.e., recognition of the identity of a speaker by the speaker's voice. In the speaker recognition application, the source model is called the speaker model.

According to a specific embodiment of the invention, a method is provided for establishing a normalizing model suitable for use with a speaker model to normalize the speaker model, the speaker model for modeling voice characteristics of a specific individual, the speaker model and the normalizing model for use in recognizing identity of a speaker, the method including the steps of identifying at least one type of acoustic input device whose transfer characteristics color the voice characteristics as modeled by the speaker model; and determining, with reference to the at least one acoustic input device type, a normalizing model including representation of transfer characteristics of the at least one acoustic input device type.

According to another embodiment of the invention, the normalizing model determining step includes determining a composite model as the normalizing model, the composite model including representation of voice characteristics of a plurality of speakers, the composite model obtained from training a seed model using normalizing training data from the plurality of speakers, the normalizing training data including data processed using acoustic input devices of the at least one acoustic input device type.

According to a still further embodiment of the invention, the type identifying step includes identifying the at least one type from among possible telephone handset types including a carbon microphone handset type and an electret microphone handset type.

According to a still further embodiment of the invention, a method is provided for identifying from input speech data a device type, called the identified device type, of an acoustic input device used in processing the speech data, the method including the steps of accepting the speech data; computing a first score for the speech data according to a first acoustic model that was built to comprise representation of transfer characteristics of a first type of acoustic input device, the first acoustic model formed by training a seed model using training acoustic data processed using an acoustic input device of the first device type; computing a second score for the speech data according to a second acoustic model that was built to comprise representation of transfer characteristics of a second type of acoustic input device, the second acoustic model formed by training a seed model using training acoustic data processed using an acoustic input device of the second device type; and providing the first device type as the identified device type if the first score exceeds the second score.

A further understanding of the nature and advantages of the present invention may be realized by reference to the remaining portions of the specification and the drawings.

DESCRIPTION OF SPECIFIC EMBODIMENTS

Figure 1:
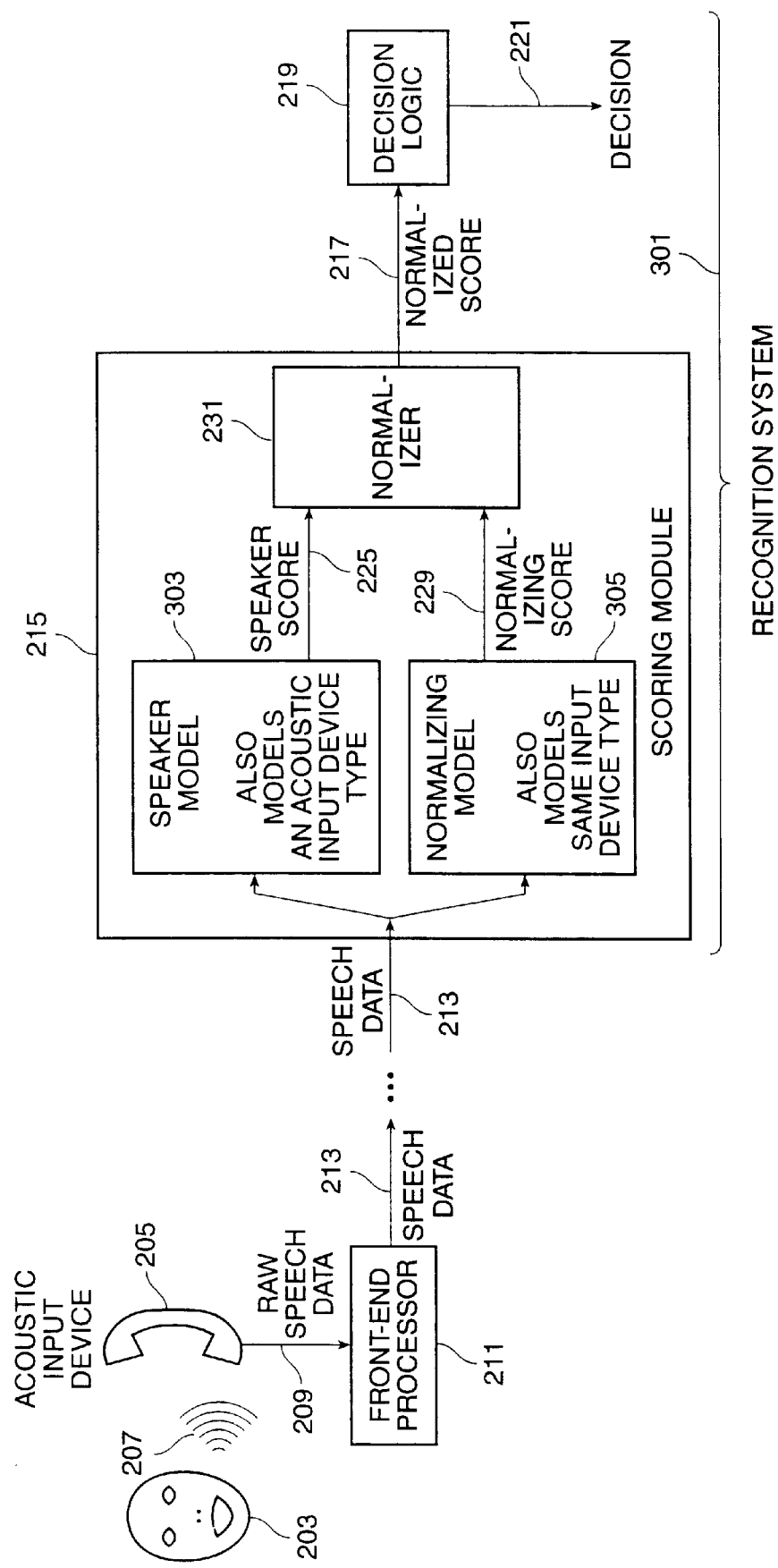
FIG. 1 is a block diagram illustrating a speaker recognition system according to embodiments of the present invention.

Recognizing A Speaker From Test Speech Data:

FIG. 1 is a block diagram illustrating a speaker recognition system 301 according to embodiments of the present invention. As shown in FIG. 1, a test speaker 203 speaks into a handset 205 that converts speech sounds 207 into a speech signal 209. A front-end processor 211 processes the speech signal 209 to extract acoustic features, thereby forming acoustic feature data 213. As will be further described below, the extracted acoustic features are a representation of the speech sounds 207 which is designed to capture characteristics of the speech sounds 207 that are useful for discriminating one speaker's voice from another's. The speech sounds 207, the speech signal 209, and the acoustic feature data 213 are all forms of speech data. Although words such as "speak" and "speech" are used throughout the specification and claims, it is to be understood that all types of oral utterances, including singing, are within the scope of speaker recognition embodiments of the present invention.

The recognition system 301 accepts the speech data 213 as input. A scoring module 215 within the recognition system 201 computes from the speech data 213 a normalized speaker score 217. The normalized score 217 is indicative of similarity between the speech data 213 and speech data which might be expected from speech spoken by a reference speaker 403 (shown only in FIG. 2 which will be described later).

Based on the normalized speaker score 217, a decision module 219 makes a decision 221 of whether to believe that the test speaker 203, whose utterance was the source of the speech data 213, is the reference speaker 403. The decision module 219 will be described in more detail below.

The scoring module 215 uses a speaker model 303 that models speech characteristics of the reference speaker 403. Using the speaker model 303, the scoring module 215 computes from the speech data 213 a speaker score 225 that is indicative of similarity between the speech data 213 and speech data which might be expected from speech spoken by the reference speaker 403.

The scoring module 215 also uses a normalizing model 305 that is used to model acoustic characteristics of sounds other than speech spoken by the reference speaker 403. Typically, the normalizing model 305 models speech spoken by a plurality of speakers other than the reference speaker 403. Using the normalizing model 305, the scoring module 215 computes from the speech data 213 a normalizing score 229 that is indicative of similarity between the speech data 213 and speech data which might be expected from the sounds modeled by the normalizing model 305.

A normalizer module 231 within the scoring module 215 uses the normalizing score 229 to normalize the speaker score 225, thereby obtaining the normalized speaker score 217. The term "normalization" is here used in the sense of providing scale to the speaker score 225 so as to provide a more meaningful measurement in the form of the normalized speaker score 217.

A speaker model 303 and a normalizing model 305 according to the present invention are intentionally matched to each other such that they each model transfer characteristics of a same type of handset, as will be described in more detail below. In this sense, the normalizing model 305 is termed a "handset-dependent" normalizing model.

A person of ordinary skill in the art will recognize that many types of acoustic features may be suitable for the speaker recognition task according to the present invention. For example, embodiments of the recognition system 301 that accept speech data 213 comprising cepstra, mel-cepstra, difference cepstra, spectra, filterbank coefficients, pitch, or speech-rate, etc., which may be filtered, warped, smoothed, averaged or otherwise signal-processed, and which need not necessarily be sequential according to time are within the scope of the present invention as claimed.

Embodiments of the recognition system 301 that accept speech data 213 comprising acoustic features that represent segments of speech, wherein a segment is itself made up of multiple within-segment feature vectors that each represents sound over a short time window are also within the scope of the present invention as claimed. In certain of such embodiments, the representations of segments of speech include mean vectors and covariance matrices computed from the multiple within-segment feature vectors. In summary, many choices of acoustic feature exist for use in the present invention.

The speaker model 303 models speech characteristics of the reference speaker 403. In embodiments of the present invention, the speaker model 303 is a representation of a characteristic distribution of acoustic feature vectors of the reference speaker 403. In embodiments of the present invention, the characteristic distribution is a probability distribution function. In embodiments of the present invention, the probability distribution function is a parametric function.

Other embodiments in which the speaker model is a template based model or a neural-net model are also within the scope of the present invention as claimed.

The normalizing model 305 models acoustic characteristics of sounds, other than speech spoken by the reference speaker 403. The normalizing model 305 typically models speech spoken by a plurality of speakers other than the reference speaker 403. In embodiments of the present invention, the normalizing model 305 is a "composite" model which models the plurality of other speakers in a pooled, or aggregate, sense, as is described for example in A. E. Rosenberg and S. Parthasarathy, "Speaker Background Models for Connected Digit Password Speaker Verification," *Proc. of ICASSP*, pp. 81–84 (1996) [hereinafter referred to as "Rosenberg '96"]. Such composite models are sometimes termed "speaker-independent models" in the literature.

In other embodiments of the present invention, the normalizing model 305 is a model made up of a collection of single-speaker "cohort" models. In certain of these possible embodiments, these single-speaker models, along with the reference speaker model 303, each models a speaker in a "closed-set" speaker recognition system, which is a system that identifies speech as belonging to one of a finite set of speakers. Using cohort speaker models for normalization in the speaker recognition task is described for example in Reynolds '96 and Rosenberg '96.

In embodiments of the present invention, the decision module 219 makes the decision 221 of whether to believe that the test speaker 203 is the reference speaker 403 by comparing the normalized score 217 with a threshold. Only if the normalized score 217 is above the threshold, is the decision made to "recognize" the test speaker 203 as the reference speaker 403. In some of these embodiments, the comparison with the threshold is performed by a machine. In other of these embodiments, a person performs the comparison and make the decision 221. Various decision logic may be implemented in the decision module 219 of the present invention.

For example, embodiments of the present invention use separate thresholds for implementing "recognize" and "reject" decisions 221. Other embodiments of the present invention utilizes decision logic which generates not a hard, yes-no decision 221 but a soft "decision" 221 that merely indicates a measurement of confidence that the test speaker 203 is the reference speaker 403. In some of these other embodiments, the normalized score itself constitutes the measure of confidence 221. Embodiments of the present invention provide user-adjustable threshold(s). Embodiments of the present invention use decision logic that incorporate the normalized score 217 in a function containing other terms, thereby implicitly using a threshold whose value becomes fixed when the other terms' values become fixed. Embodiments of the present invention employ learning logic that automatically determines a threshold based on test-runs, as will be described below.

In a specific embodiment of the present invention, the recognition system 301 accepts speech data 213 from a front-end processor 211 that generates a vector of acoustic features every 10 ms from a sliding 25 ms window of the speech signal 209. For each window of the speech signal, the front-end processor 211 produces 17th order mel-cepstra, with the zeroeth order removed, and with cepstral mean subtraction performed. Mel-cepstra is known in the art and is described, for example, in Atal '74.

In a specific embodiment of the present invention, the speaker model 303 is a probability distribution function of acoustic feature vectors of the reference speaker 403. In particular, the distribution function is an M-mixture Gaussian mixture model (GMM). The GMM is formed by training a seed model with training speech data according to the expectation-maximization (EM) algorithm. As used herein, a "seed model" refers to any model whose parameters are to be further trained using training data. Therefore, a seed model includes a model that has just been initialized, for example with random or heuristically generated values, and also a model which has already undergone some training with prior training data.

GMMs, as used for speaker recognition, are known in the art and are described in, for example, D. A. Reynolds, "Speaker Identification And Verification Using Gaussian Mixture Speaker Models," *Speech Communication*, vol. 17, nos. 1–2, pp. 91–108 (August, 1995). The preceding reference also provides explanation of speaker recognition in general. The EM algorithm is well known in the art and is explained in, for example, A. Dempster, N. Laird, and D. Rubin, "Maximum Likelihood From Incomplete Data Via The EM Algorithm," J. R. Stat. Soc. Lond., Vol 39, pp.1–38 (1977).

In a specific embodiment of the present invention, the speaker model 303 for the reference speaker 403, k, is expressed as $$p(\overline{x}_t | \lambda_k) = \sum_{i=1}^{M} p_{i,k} b_{i,k}(\overline{x}_t), \quad (1)$$

wherein $\overline{x}_t$ is a vector of acoustic features within the speech data 213, $\lambda_k$ represents the speaker model 303, $p_{i,k}$ is the mixture weight of the i-th mixture distribution of the speaker model 303, and $b_{i,k}(\ )$ is the i-th Gaussian density out of M for the speaker model 303. Various design choices may be made regarding the structure of the GMM mixture model, such as the number M of mixtures to use, and whether the Gaussian densities $b_{i,k}(\ )$ should use full covariance matrices or diagonal covariance matrices. These choices may be made based in part on the amount of training speech data available. A specific embodiment of the present invention uses at least two minutes of training speech data from the reference speaker 403 to train a 128-mixture (M=128), diagonal-covariance Gaussian mixture seed model to form a 128-mixture, diagonal-covariance Gaussian mixture speaker model 303.

Under the above GMM speaker model 303, the speaker score 225 is simply the average log-likelihood that the speech data 213, $X = \{\overline{x}_1 \ldots \overline{x}_T\}$, was uttered by the reference speaker 403, according to the speaker model 303. This speaker score 225 is computed as $$L(X | \lambda_k) = \frac{1}{T} \sum_{t=1}^{T} \log p(\overline{x}_t | \lambda_k). \quad (2)$$

In a specific embodiment of the present invention, the normalizing model 305 is a composite model which models a plurality of speakers other than the reference speaker 403 using an N-mixture GMM probability distribution function of acoustic feature vectors. This function is computed as $$p(\overline{x}_t | \overline{\lambda}_k) = \sum_{i=1}^{N} p_{i,\overline{k}} b_{i,\overline{k}}(\overline{x}_t), \quad (3)$$

wherein $\overline{\lambda}_k$ represents the normalizing model 305, which is formed using the EM algorithm using training data from the plurality of speakers. Again, design choices can be made regarding the structure of the GMM. A specific embodiment of the present invention uses at least 2.8 minutes of training data from 90 speakers of both sexes to train a 1280-term (N=1280), diagonal-covariance Gaussian mixture seed model to form a 1280-term, diagonal-covariance Gaussian mixture normalizing model 305.

In a specific embodiment of the present invention, the normalizing score 305 is a log likelihood computed as $$L(X | \overline{\lambda}_k) = \frac{1}{T} \sum_{t=1}^{T} \log p(\overline{x}_t | \overline{\lambda}_k). \quad (4)$$

In a specific embodiment of the present invention, the normalized score 217 is the following log likelihood ratio of the above speaker score 225 and normalizing score 229:

$$\Lambda(X|\lambda_k) = L(X|\lambda_k) - L(X | \overline{\lambda}_k). \quad (5)$$

In a specific embodiment of the present invention, the decision module 219 uses a threshold for making the decision 221 to "recognize" the test speaker 203 as the reference speaker 403. In a specific embodiment of the present invention, this threshold is determined by calculating normalized scores 217 on test speech data 213 known to be from the reference speaker 403 and on test speech data 213 known to be from imposter speakers and choosing a threshold, ex post, that minimizes recognition error on these test speech data. In choosing this threshold, a trade-off may be made between fewer missed recognitions (lower threshold) and fewer false recognitions (higher threshold).

Handset-Dependent Normalizing Model:

Generally speaking, a model will represent characteristics of the data with which it has been trained. Therefore, if a model has been trained with training data processed using a handset of a certain type, then the model will be colored by transfer characteristics of the handset, and of the type of handset. Put another way, the model will include a representation of transfer characteristics of the type of handset.

A model may simultaneously comprise representation of more than one type of handset. A model that models multiple types of handsets may be said to model a first type more "strongly" than another, second type if, for example, the model was formed using more training data processed using the first type than training data processed using the second type of handset.

In general, a speaker model 303 will model both the reference speaker 403 and also a handset used in processing the training data used to form the speaker model 303. Consequently, a speaker score 225 computed for test speech data 213 will reflect both the degree to which the test data 213 matches the reference speaker 403 and also the degree to which the test data 213 matches the handset(s) used in processing the training data. It is this handset component of the speaker score 225 which gives rise to the handset mismatch problem discussed above, when using typical acoustic features such as cepstra. See Reynolds '96.

As mentioned before, embodiments of the present invention normalize variability due to handset effects by using handset-dependent normalizing models 305. Using handset-dependent normalizing models 305 provides increased system robustness, for example, in situations in which a true (i.e., the reference) test speaker 203 scores 225 poorly on the speaker model 303 merely because she used a handset of a type not modeled by the speaker model 303.

Figure 2:
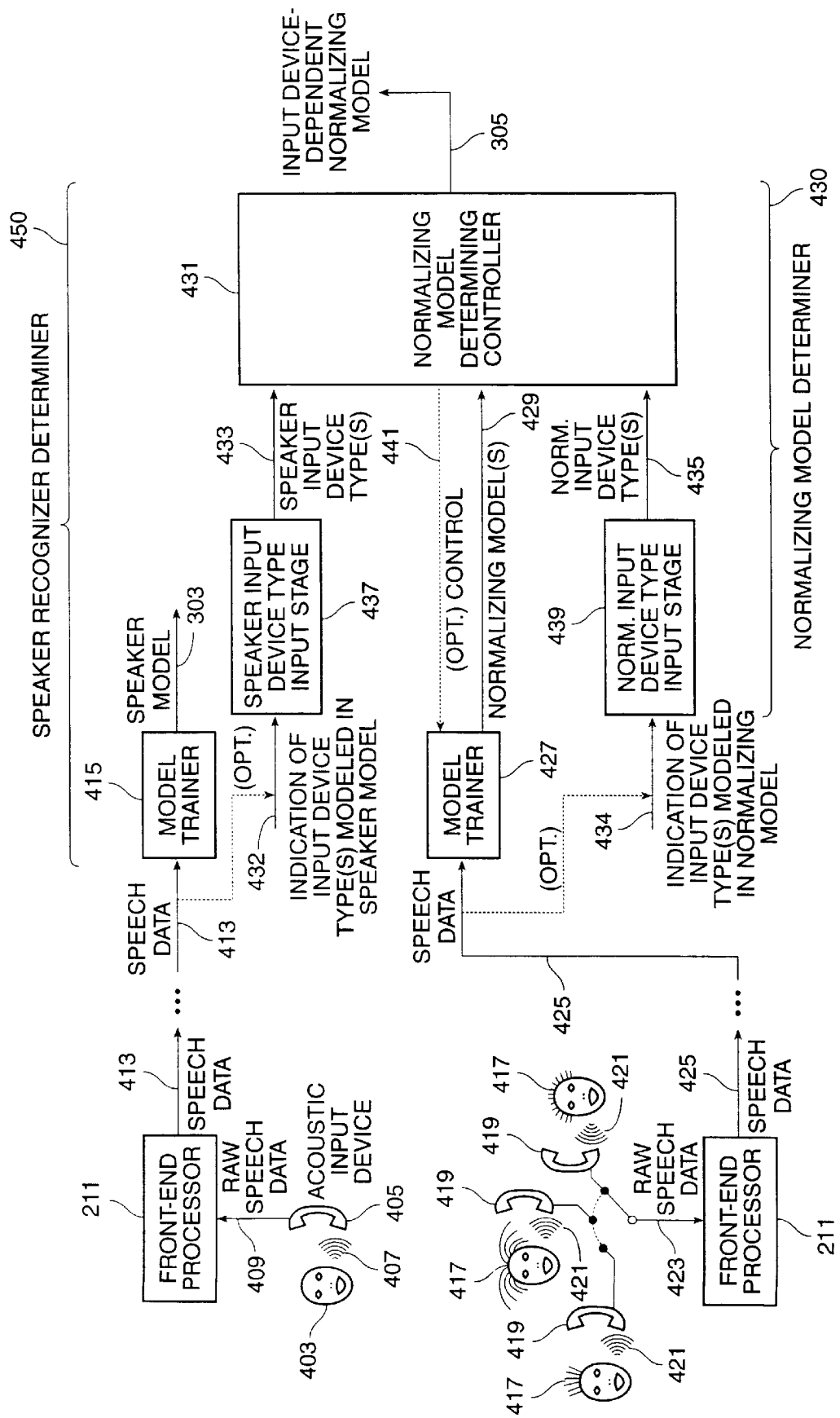
FIG. 2 is a block diagram illustrating a system for determining a handset-dependent normalizing model according to embodiments of the present invention.

FIG. 2 is a block diagram illustrating a system and associated environment for determining a handset-dependent normalizing model 305 for use with a speaker model 303 for speaker recognition according to embodiments of the present invention.

Formation of the speaker model 303 will now be described. The reference speaker 403 speaks into a handset 405 that converts speech sounds 407 into a speech signal 409. A front-end processor 211 processes the speech signal 409 to extract acoustic features, thereby forming speech data 413. A speaker model trainer 415 accepts the speech data 413 as input. The speaker model trainer 415 forms a speaker model 303 using the speech data 413 as training data. The speaker model 303 models characteristics of reference speaker 403's voice as well as characteristics of the handset 405. Although a single handset 405 is shown for simplicity, it is to be understood that in general the speech data 413 may be collected over multiple speaking sessions and may be collected using different handsets 405 which may be of different types.

Attention is now turned to the normalizing model 305. Normalizing speakers 417 who are not the target speaker 403 speak into handsets 419 that convert speech sounds 421 into speech signals 423. A front-end processor 211 processes the speech signals 423 to extract acoustic features, thereby forming speech data 425. A normalizing model trainer 427 accepts the speech data 425 as input. The normalizing model trainer 427 forms a normalizing model 429 using the speech data 425 as training data. The normalizing model 429 models characteristics of the voices of normalizing speakers 417 as well as characteristics of the handsets 419. Although handsets 419 are shown as multiple handsets, it is to be understood that in general the speech data 425 may be collected from speakers 417 using even a single, particular handset 419.

A normalizing model determiner 430 establishes the handset-dependent normalizing model 305 for use with the speaker model 303. The normalizing model determiner 430 includes a speaker handset type input stage 437 and a normalizing handset type input stage 439 that receive speaker handset type indication 432 and normalizing handset type indication 434, respectively. Indications 432 and 434 are indicative of handset types modeled by the speaker model 303 and the normalizing model 429, respectively. Based on the indication 432, the input stage 437 ascertains at least one speaker handset type 433 that is modeled by the speaker model 303. Based on the indication 434, the input stage 439 ascertains at least one normalizing handset type 435 that is modeled by the normalizing model 429.

A normalizing model selection controller 431 within the normalizing model determiner receives and compares the speaker handset type(s) 433 and the normalizing handset type(s) 435. If the normalizing handset type(s) 435 include all speaker handset type(s) 433, the controller 431 determines the handset-dependent normalizing model 305 by providing the normalizing model 429 as the handset-dependent normalizing model 305.

In embodiments of the present invention, the speaker handset type indicator 432 is a portion of the speaker speech data 413. In these embodiments, the speaker handset type input stage 437 is a handset type detector, which will be described below in connection with FIG. 3. In some of these embodiments, the portion 432 is divided into subportions that are individually applied to the handset type detector 437, wherein each subportion is known to have been processed using a same type of handset, for example because each subportion is from a single speaking session.

In embodiments of the present invention, the normalizing handset type indicator 434 is a portion of the normalizing speech data 425. In these embodiments, the normalizing handset type input stage 439 is a handset type detector, which will be described below in connection with FIG. 3. In some of these embodiments, the portion 434 is divided into subportions that are individually applied to the handset type detector 439, wherein each subportion is known to have been processed using a same type of handset, for example because each subportion is from a single speaking session.

In embodiments of the present invention, the speaker handset type is known, and therefore the indicator 432 simply is the speaker handset type(s) 433, which information is passed on by the speaker handset type input stage 437. In embodiments of the present invention, the normalizing handset type is known, and therefore the indicator 434 simply is the normalizing handset type(s) 435, which information is passed on by the normalizing handset type input stage 439.

In embodiments of the present invention, the controller 431 is presented with speaker handset type(s) 433 that represent all handset type(s) reasonably expected to be encountered during testing that are modeled by the speaker model 303. These embodiments provide increased system robustness against erroneously recognizing an impostor test speaker who happens to use a handset from among of one of the speaker handset type(s) 433. In certain of these embodiments, the handset type(s) 433 are known to represent all handset type(s) modeled by the speaker model 303 because a portion of the normalizing speech data 413 from every speaking session in which the normalizing data 413 were created is presented to the optional handset type detector 437.

In embodiments of the present invention, the controller 431 is presented with normalizing handset type(s) 435 that represent all handset type(s) modeled by the normalizing model 429. These embodiments provide increased system robustness against erroneously rejecting a true test speaker who happens to use a handset from among of one of the normalizing handset type(s) 435. In certain of these embodiments, the handset type(s) 435 are known to represent all handset type(s) modeled by the normalizing model 429 because a portion of the normalizing speech data 425 from every speaking session in which the normalizing data 425 were created is presented to the optional handset type detector 439.

In embodiments of the present invention, the controller 431 receives a library of normalizing models 429, and normalizing handset types 435 associated with each of the models 429, from the normalizing model trainer 427. In these embodiments, the controller 431 chooses one of the normalizing models 429 to establish as the handset-dependent normalizing model 305 based on handset type comparisons as described earlier.

In embodiments of the present invention, the controller 431 is coupled to control 441 the normalizing model trainer 427 and the handset type detector 439. In these embodiments, the controller 431 identifies the handset type(s) that need to be modeled in the normalizing model 305, as described earlier, and actively directs the normalizing model trainer 427 to custom build the normalizing model 429 using speech data 425 processed using the proper type of handset, according to training methods as discussed herein. In these embodiments, the normalizing model trainer 427 are considered to be part of the normalizing model determiner 430.

In specific embodiments of the present invention, the controller 431 ascertains whether a first speaker handset type from speaker handset types 433 is modeled more strongly in the speaker model 303 than a second speaker handset type from speaker handset types 433. If so, the controller determines a handset-dependent normalizing model 305, according to the above-described methods, that also models the first speaker handset type more strongly than the second speaker handset type. In some of these specific embodiments, the controller 431 ascertains that the first handset type is modeled more strongly in the speaker model 303 by examining relative amounts of training data 413 processed using the first and second types of handsets, which relative amounts are indicated in these some embodiments by the speaker handset type information 433. In one of these some embodiments, the controller determines a handset-dependent normalizing model 305, according to the above-described methods, that models the first and second speaker handset types in the same proportion as does the speaker model 303, by controlling the relative amounts of normalizing training data 425 processed using the first and second types of handsets to be the same as the relative amounts in the speaker training data 413.

Model trainers 415 and 427 are known in the art. Models and training of models have been discussed earlier, in connection with FIG. 1. In specific embodiments of the present invention, model trainers implement the EM algorithm to form parametric models, including Gaussian mixture models, as discussed earlier.

The model trainer 415 plus the normalizing model determiner 430 together comprise a speaker recognizer determiner 450 whose product is the speaker model 303 and the handset-dependent normalizing model 305, which together form the heart of a speaker recognizer system.

Figure 3:
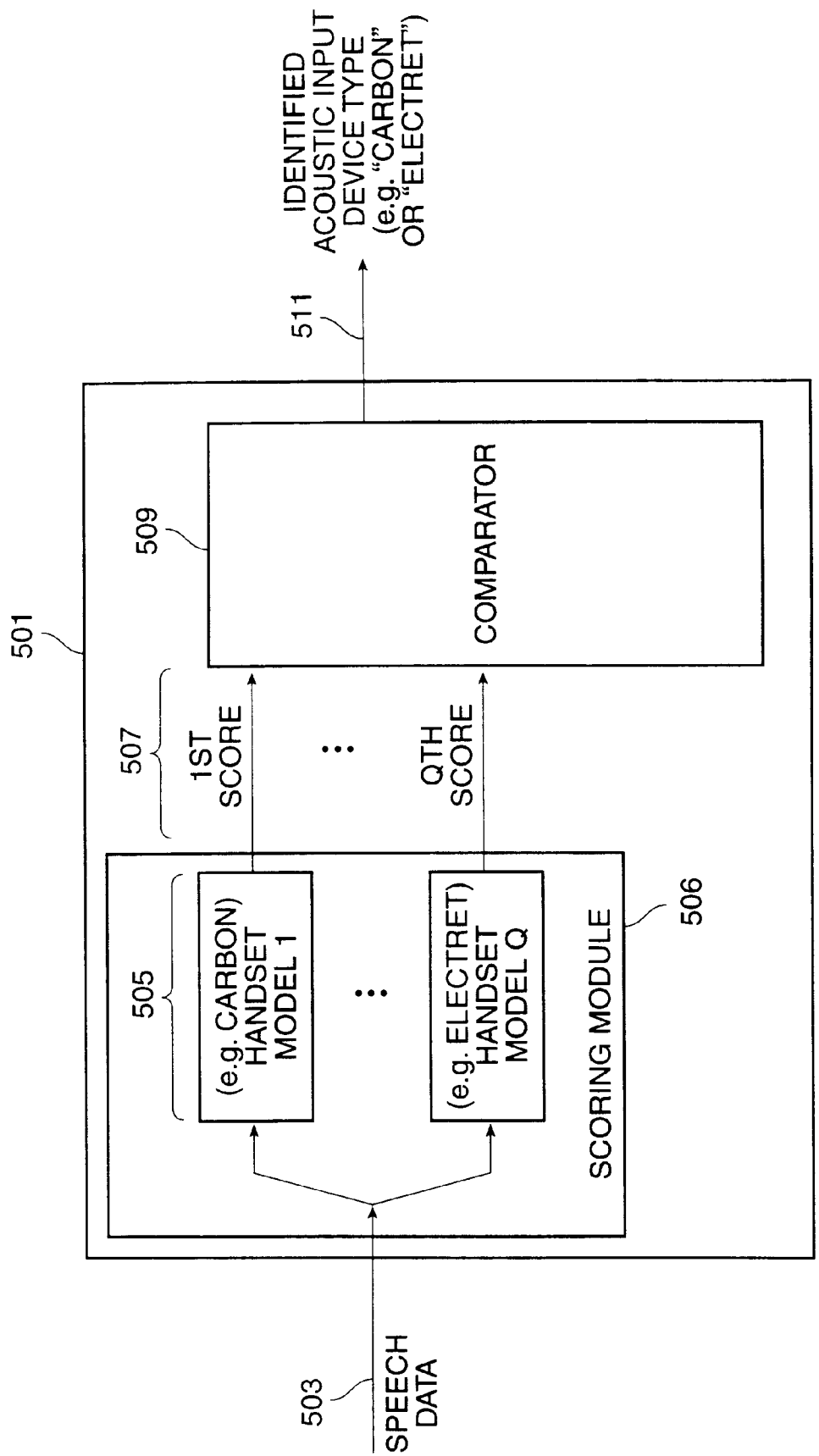
FIG. 3 is a block diagram illustrating a handset type detector according to an embodiment of the present invention.

FIG. 3 is a block diagram illustrating a handset type detector 501, according to an embodiment of the present invention, for identifying from speech data a handset type used in processing the speech data. Handset type detector 501 corresponds to handset type detectors 437 and 439 from FIG. 2.

Speech data 503 are presented to a scoring module 506 within the handset type detector 501. The scoring module 506 makes use of a plurality of Q acoustic handset models 505 that each models transfer characteristics of a type of handset. The scoring module 506 applies the acoustic data 503 to the handset models 505 to compute Q handset type scores 507 that are each indicative of similarity between the speech data 503 and speech data which might be expected from sounds processed using a type of handset. A comparator 509 within the detector 501 compares the scores 507, chooses the highest score from among the scores 507, and identifies the corresponding handset type as a type of handset 511 used in forming the speech data 503.

The acoustic handset models are formed in the manner of other acoustic models discussed earlier. In embodiments of the present invention, each acoustic handset model is formed using training speech data processed using the corresponding type of handset. In a specific embodiment of the present invention, the models are formed using training speech data derived from human speech. In a specific embodiment of the present invention the models are Gaussian mixture models. In a specific embodiment of the present invention the models are Gaussian mixture models formed by using the EM algorithm to train a seed GMM. In a specific embodiment of the present invention, the models 505 include a carbon microphone telephone handset model and an electret microphone telephone handset model. In a specific embodiment of the present invention, the models 505 include a carbon microphone telephone handset model and an electret microphone telephone handset model, each of which is a GMM with at least approximately 512 diagonal-covariance Gaussian distributions formed using the EM algorithm, wherein each of the models 505 is trained using a total of at least approximately 1.5 hours of training speech data processed using the corresponding type of handset.

While the above is a complete description of specific embodiments of the invention, various modifications, alternative constructions, and equivalents may be used. Therefore, the above description should not be taken as limiting the scope of the invention as defined by the claims.

What is claimed is:

1. A method for establishing a normalizing model suitable for use with a speaker model to normalize said speaker model, said speaker model for modeling voice characteristics of a specific individual, said speaker model and said normalizing model for use in recognizing identity of a speaker, the method comprising the steps of:

identifying at least one type of acoustic input device whose transfer characteristics color said voice characteristics as modeled by said speaker model; and determining, with reference to said at least one acoustic input device type, a normalizing model comprising representation of transfer characteristics of said at least one acoustic input device type.

2. The method according to claim 1, wherein the normalizing model determining step comprises determining a composite model as said normalizing model, said composite model comprising representation of voice characteristics of a plurality of speakers, said composite model obtained from training a seed model using normalizing training data from said plurality of speakers, said normalizing training data including data processed using acoustic input devices of said at least one acoustic input device type.

3. The method according to claim 2, wherein the normalizing model determining step comprises determining said composite model by training a Gaussian mixture seed model using normalizing training data from said plurality of speakers, said normalizing training data including data processed using acoustic input devices of said at least one acoustic input device type.

4. The method according to claim 1, wherein the normalizing model determining step comprises determining a model, as said normalization model, that comprises representation of transfer characteristics of types of acoustic input devices only from among said at least one acoustic input device type.

5. The method according to claim 4, wherein the normalizing model determining step comprises training a seed model using normalizing training data, including data processed using acoustic input devices of said at least one acoustic input device type, to obtain said normalizing model.

6. The method according to claim 4,
wherein said at least one identified type includes a first identified type and a different second identified type;
wherein the method further comprises the step of ascertaining that said first identified type of acoustic input device was used more heavily in creating said speaker model than was said second identified type; and
wherein the normalizing model determining step comprises determining a model, as said normalization model, that comprises stronger representation of transfer characteristics of said first identified type than representation of transfer characteristics of said second identified type.

7. The method according to claim 1, wherein the identifying step comprises the steps of:
accepting a portion of speech data used in creating said speaker model;
computing a first score for said portion according to a first acoustic model that was built to comprise representation of transfer characteristics of a first type of acoustic input device, said first acoustic model formed by training a seed model using training acoustic data processed using an acoustic input device of said first device type;
computing a second score for said portion according to a second acoustic model that was built to comprise representation of transfer characteristics of a second type of acoustic input device, said second acoustic model formed by training a seed model using training acoustic data processed using an acoustic input device of said second device type; and
ascertaining that said first device type was used in creating said speaker model if said first score exceeds said second score.

8. The method according to claim 1, wherein the type identifying step comprises identifying all types of acoustic input device used in creating said speaker model as said at least one acoustic input device type.

9. The method according to claim 8, wherein the normalizing model determining step comprises determining a model, as said normalization model, that comprises representation of transfer characteristics of types of acoustic input devices only from among said at least one acoustic input device type.

10. A method for recognizing identity of a test speaker from input speech data from said test speaker, the method employing a normalizing model suitable for use with a speaker model comprising representation of voice characteristics of a reference speaker, said normalizing model being established by the method according to claim 9, the method for recognizing comprising the steps of:
accepting said input speech data;
computing a normalized score for said input speech data according to the speaker model and the normalizing model; and
deciding, based on said normalized score, whether said input speech data was derived from said reference speaker.

11. The method according to claim 1, wherein the normalizing model determining step comprises selecting a model, as said normalizing model, from a preexisting library of models.

12. A normalizing model established in accordance with the method according to claim 1.

13. A method for recognizing identity of a test speaker from input speech data from said test speaker, the method comprising the steps of:
accepting said input speech data, wherein said input speech data was processed using a test acoustic input device, wherein type of said acoustic input device is not known for the purpose of recognizing said identity;
computing a normalized score for said input speech data according to a speaker model and a normalizing model, said speaker model comprising representation of voice characteristics of a reference speaker and representation of transfer characteristics of a training type of acoustic input device, said normalizing model comprising representation of acoustic characteristics of sounds not spoken by said reference speaker and representation of transfer characteristics of said training type of acoustic input device; and
deciding, based on said normalized score, whether said input speech data was derived from said reference speaker.

14. The method according to claim 13 wherein said normalizing model was established by the steps of:
identifying at least one type of acoustic input device used in creating said speaker model; and
determining, with reference to said at least one type, said normalizing model comprising representation of transfer characteristics of said at least one acoustic input device type, wherein said training acoustic input device type is from among said at least one acoustic input device type.

15. A method for building a speaker recognition system comprising the steps of:
accepting acoustic speaker training data, the speaker training data being derived from a speaker;
training a seed model using said speaker training data to establish a speaker model for the speaker; and
identifying at least one type of acoustic input device used in deriving said speaker training data, wherein the identifying step comprises the steps of:
computing a first score for a portion of said speaker training data according to a first acoustic model that was built to comprise representation of transfer characteristics of a first type of acoustic input device, said first acoustic model formed by training a seed model using training acoustic data processed using an acoustic input device of said first device type;

computing a second score for said speaker training data portion according to a second acoustic model that was built to comprise representation of transfer characteristics of a second type of acoustic input device, said second acoustic model formed by training a seed model using training acoustic data processed using an acoustic input device of said second device type; and comparing said first score to said second score.

16. A method for building a speaker recognition system comprising the steps of:

accepting acoustic speaker training data, the speaker training data being derived from a speaker;

training a seed model using said speaker training data to establish a speaker model for the speaker;

identifying at least one type of acoustic input device used in deriving said speaker training data; and determining, with reference to said at least one acoustic input device type, a normalizing model comprising representation of transfer characteristics of said at least one acoustic input device type.

17. A method for identifying from input speech data a device type, called the identified device type, of an acoustic input device used in processing said speech data, the method comprising the steps of:

accepting said speech data;

computing a first score for said speech data according to a first acoustic model that was built to comprise representation of transfer characteristics of a first type of acoustic input device, said first acoustic model formed by training a seed model using training acoustic data processed using an acoustic input device of said first device type;

computing a second score for said speech data according to a second acoustic model that was built to comprise representation of transfer characteristics of a second type of acoustic input device, said second acoustic model formed by training a seed model using training acoustic data processed using an acoustic input device of said second device type; and providing said first device type as said identified device type if said first score exceeds said second score.

18. The method according to claim 17, wherein the first score computing step comprises computing said first score according to a Gaussian mixture model, said Gaussian mixture model being said first acoustic model; and wherein the second score computing step comprises computing said second score according to a Gaussian mixture model, said Gaussian mixture model being said second acoustic model.

19. A speaker recognition system for recognizing identity of a test speaker from input speech data from said test speaker, wherein said input speech data was processed using an acoustic input device of a test type from among expected test types, the system comprising:

a speaker model comprising representation of voice characteristics of a reference speaker and representation of transfer characteristics of a type of acoustic input device herein called the represented type, said speaker model comprising representation of less than all of said expected test types;

a normalizing model comprising representation of acoustic characteristics of sounds not spoken by said reference speaker and representation of transfer characteristics of said represented acoustic input device type; and a scoring module coupled to said speaker model and said normalizing model and coupled to accept said input speech data, the scoring module for computing from said input speech data a normalized score using said speaker model and said normalizing model, said normalized score indicating similarity between said input speech data and said voice characteristics of said reference speaker.

20. The system according to claim 19, wherein said normalizing model comprises representation of transfer characteristics of acoustic input device types only from among types whose transfer characteristics are represented in said speaker model.

21. The system according to claim 19, wherein:

said speaker model comprises representation of transfer characteristics of, in addition to said represented acoustic input device type herein called the first type, a second type of acoustic input device, said representation of transfer characteristics of said second type being stronger than said representation of said first type; and said normalizing model comprises representation of transfer characteristics of said first and second types of acoustic input devices, said representation of transfer characteristics of said second type being stronger than said representation of said first type.

22. A speaker recognition system for recognizing identity of a test speaker from input speech data from said test speaker, wherein said input speech data was processed using an acoustic input device of a test type from among expected test types, the system comprising:

a speaker model comprising representation of voice characteristics of a reference speaker and representation of transfer characteristics of said expected test types;

a normalizing model comprising representation of acoustic characteristics of sounds not spoken by said reference speaker and representation of transfer characteristics of a type of acoustic input device whose transfer characteristics are represented in said speaker model; and a scoring module coupled to said speaker model and said normalizing model and coupled to accept said input speech data, the scoring module for computing from said input speech data a normalized score using said speaker model and said normalizing model, said normalized score indicating similarity between said input speech data and said voice characteristics of said reference speaker.

23. The system according to claim 22, wherein said expected test acoustic input device types are a carbon microphone telephone type and an electret microphone telephone type.

24. The system according to claim 22, wherein said normalizing model comprises representation of transfer characteristics of all said expected types.

25. The system according to claim 22, wherein said normalizing model comprises representation of transfer characteristics of all types of acoustic input devices whose transfer characteristics are represented in said speaker model.

26. The system according to claim 22, wherein all acoustic input device types whose transfer characteristics are represented in said normalizing model are from among types of acoustic input devices whose transfer characteristics are represented in said speaker model.

27. The system according to claim 22, wherein:

said speaker model comprises representation of transfer characteristics of, in addition to said represented acoustic input device type herein called the first type, a second type of acoustic input device, said representation of transfer characteristics of said second type being stronger than said representation of said first type; and wherein said normalizing model comprises representation of transfer characteristics of said first and second types of acoustic input devices, said representation of transfer characteristics of said second type being stronger than said representation of said first type.

28. A system for establishing a normalizing model suitable for use with a speaker model to normalize said speaker model, said speaker model for modeling voice characteristics of a specific individual, said speaker model and said normalizing model for use in recognizing identity of a speaker, the system comprising:

an input stage coupled to accept a signal indicative of at least one acoustic input device type whose transfer characteristics color said voice characteristics as modeled by said speaker model, said input stage for identifying said at least one speaker acoustic input device type from said signal and providing said at least one type; and a controller coupled to receive said at least one speaker input device type, said controller for determining, with reference to said at least one acoustic input device type, a normalizing model comprising representation of transfer characteristics of said at least one acoustic input device type.

29. The system according to claim 28, wherein said signal is a portion of training data used in establishing said speaker model, and wherein said input stage is a type detector comprising:

a first input device model comprising representation of transfer characteristics of a first type of acoustic input device;

a second input device model comprising representation of transfer characteristics of a second type of acoustic input device;

a scoring module coupled to said first and second device models and coupled to accept said input data, said scoring module for computing from said input data a first device score using said first device model and a second device score using said second device model; and a comparator coupled to receive said first device score and said second device score, said comparator for comparing said first and second scores and if said first score is greater than said second score identifying and providing said first type as one of said at least one acoustic input device type.

30. The system according to claim 28 further comprising a normalizing model trainer for training a seed model using normalizing training data from a plurality of speakers other than said individual, said normalizing training data including data processed using an acoustic input device of said at least one acoustic input device type, said normalizing model trainer coupled to said controller, said controller providing said trained model from said normalizing model trainer as said normalizing model.

31. A type detector for identifying from input speech data a device type, called the identified device type, of an acoustic input device used in processing said speech data, the type detector comprising:

a first input device model comprising representation of transfer characteristics of a first type of acoustic input device;

a second input device model comprising representation of transfer characteristics of a second type of acoustic input device;

a scoring module coupled to said first and second device models and coupled to accept said input speech data, said scoring module for computing from said input speech data a first device score using said first device model and a second device score using said second device model; and a comparator coupled to receive said first device score and said second device score, said comparator for comparing said first and second scores and if said first score is greater than said second score indicating said first type as said identified device type.

* * * * *

UNITED STATES PATENT AND TRADEMARK OFFICE
CERTIFICATE OF CORRECTION

PATENT NO. : 5,950,157
DATED : September 7, 1999
INVENTOR(S) : Larry P. Heck and Mitchel Weintraub It is certified that error appears in the above-identified patent and that said Letters Patent is hereby corrected as shown below:

IN THE STATEMENT OF RELATED APPLICATIONS

Column 1, at line 11, remove "This invention was made in whole or in part with the use of Government funds. The Government may have certain rights in the invention." and insert --This invention was made with Government support under contract awarded by the National Security Agency under contract number MDA904-96-C-0844. The Government has certain rights in this invention.--

Signed and Sealed this

Twenty-fifth Day of April, 2000

Attest:

Q. TODD DICKINSON

*Attesting Officer*                *Director of Patents and Trademarks*